(12) United States Patent
Asano et al.

(10) Patent No.: US 10,195,900 B2
(45) Date of Patent: *Feb. 5, 2019

(54) PNEUMATIC TIRE WITH SPECIFIED TREAD THICKNESS DISTRIBUTION AND SPECIFIED SECTION WIDTH IN RELATION TO BEAD DIAMETER

(71) Applicant: SUMITOMO RUBBER INDUSTRIES, LTD., Kobe-shi, Hyogo (JP)

(72) Inventors: Kazuo Asano, Kobe (JP); Yasuhiro Kubota, Kobe (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 407 days.

This patent is subject to a terminal disclaimer.

(21) Appl. No.: 14/905,513

(22) PCT Filed: Aug. 4, 2014

(86) PCT No.: PCT/JP2014/070451
§ 371 (c)(1),
(2) Date: Jan. 15, 2016

(87) PCT Pub. No.: WO2015/019990
PCT Pub. Date: Feb. 12, 2015

(65) Prior Publication Data
US 2016/0152076 A1 Jun. 2, 2016

(30) Foreign Application Priority Data
Aug. 6, 2013 (JP) .................................. 2013-163492

(51) Int. Cl.
*B60C 11/00* (2006.01)
*B60C 3/04* (2006.01)
(Continued)

(52) U.S. Cl.
CPC .................. *B60C 3/04* (2013.01); *B60C 3/00* (2013.01); *B60C 9/02* (2013.01); *B60C 11/00* (2013.01);
(Continued)

(58) Field of Classification Search
CPC ............. B60C 11/0008; B60C 11/0083; B60C 11/0332; B60C 11/00; B60C 2011/0033; B60C 3/04; B60C 3/00; B60C 9/0292
(Continued)

(56) References Cited

U.S. PATENT DOCUMENTS 9,669,660 B2 * 6/2017 Asano ................. B60C 11/0332
2014/0138003 A1 * 5/2014 Kuwayama ............... B60C 3/04
152/454

FOREIGN PATENT DOCUMENTS

EP    0 321 730 A1    6/1989
EP    1 459 909 A1    9/2004
(Continued)

OTHER PUBLICATIONS

International Search Report issued in PCT/JP2014/070451 dated Nov. 4, 2014.
(Continued)

*Primary Examiner* — Adrienne C. Johnstone
(74) *Attorney, Agent, or Firm* — Birch, Stewart, Kolasch & Birch, LLP

(57) ABSTRACT

A pneumatic tire includes a carcass extending between bead cores of bead portions through a tread portion. A tire section width Wt (unit: mm) in relation to a bead diameter Db (unit: inch) satisfies the following equations, $Wt \leq -0.7257 \times (Db)^2 + 42.763 \times Db - 339.67$, and $Wt \geq -0.7257 \times (Db)^2 + 48.568 \times Db - 552.33$. In a tread thickness distribution curve $f(y)$ represented by equation $f(y)=1-t(y)/t(0)$, when $y=0.4$, the value of $f(y)$ is of from 0.03 to 0.06, and a rate of change
(Continued)

of the value of f(y) increases to y=0.4 and decreases thereafter, where t(y) denotes a tread thickness at each tire axial position Py, and y represents a ratio of an axial distance from the tire equatorial plane, to the maximum-width L of the carcass.

4 Claims, 7 Drawing Sheets

(51) Int. Cl.
    *B60C 3/00*     (2006.01)
    *B60C 9/02*     (2006.01)
    *B60C 15/00*     (2006.01)
    *B60C 13/00*     (2006.01)
    *B60C 11/03*     (2006.01)

(52) U.S. Cl.
    CPC ...... *B60C 11/0008* (2013.01); *B60C 11/0083* (2013.01); *B60C 11/0332* (2013.01); *B60C 13/00* (2013.01); *B60C 15/00* (2013.01); *B60C 15/0036* (2013.01); *B60C 9/0292* (2013.01); *B60C 2011/0033* (2013.01); *Y02T 10/862* (2013.01)

(58) Field of Classification Search
    USPC ................................ 152/209.1, 209.14, 454
    See application file for complete search history.

(56) References Cited

FOREIGN PATENT DOCUMENTS

| | | |
|---|---|---|
| JP | 8-40014 A | 2/1996 |
| JP | 2004-002622 A | 1/2004 |
| JP | 2004-010791 A | 1/2014 |
| JP | 2004-017903 A | 1/2014 |
| WO | WO 2012/176476 A1 | 12/2012 |

OTHER PUBLICATIONS

Extended European Search Report dated Mar. 14, 2017, in European Patent Application No. 14834200.9.
Written Opinion of the International Searching Authority issued in PCT/JP2014/070451 dated Nov. 4, 2014.
English translation of Written Opinion of the International Searching Authority issued in PCT/JP2014/070451 dated Nov. 4, 2014.

* cited by examiner (Comparative example 3A)

(Comparative example 3B)

(Example 3A)

(Example 3B)

PNEUMATIC TIRE WITH SPECIFIED TREAD THICKNESS DISTRIBUTION AND SPECIFIED SECTION WIDTH IN RELATION TO BEAD DIAMETER

TECHNICAL FIELD

The present invention relates to a pneumatic tire having improved fuel consumption while maintaining uneven wear resistance of a shoulder portion.

BACKGROUND ART

As a factor of fuel economy in tires, rolling resistance of tires and air resistance is known. The major cause of rolling resistance of tires is energy loss due to repeated deformation of rubber during traveling. In order to reduce the rolling resistance, it is proposed to use a tread rubber having low energy loss (low tan $\delta$).

When the tread rubber having low energy loss is used, although the rolling resistance is reduced, grip performance (especially, wet grip performance) is, however, lowered, and there is another problem that the abrasion resistance is deteriorated. As shown in Patent Documents 1 and 2 below, studies of the tread rubber composition having a reduced rolling resistance while improving wear resistance has been developed. Unfortunately, only improvement depending on rubber composition gives insufficient effect. Thus, another approach to improve rolling resistance in terms of other than improvement of rubber composition is strongly demanded.

In view of these circumstances, the present inventors who had conducted studies were able to find the following. When a tire section width is reduced while maintaining its tire outer diameter, a tread width is also decreased accordingly. Accordingly, the volume of the tread rubber is reduced. As a result, the energy loss caused by the tread rubber is reduced, and the weight of the tire is also reduced. Furthermore, when viewing a vehicle from its front, a tire exposed area appearing downwardly from a bumper edge is reduced according to the reduced tire section width. This makes it possible to reduce the air resistance of the tire. Furthermore, when a bead diameter is enlarged while maintaining its tire outer diameter, a sidewall region which tends to deform largely during traveling narrows. As a result, a reduction in energy loss in the sidewall region as well as the weight of the tire can be achieved.

Therefore, it has been confirmed that a narrow width and large bead diameter tire in which the tire section width is reduced while enlarging the bead diameter has significantly improved fuel economy through reduction of energy loss in the tread portion and the sidewall portion, reduction of tire mass, and reduction of air resistance.

Unfortunately, as a result of further study of the inventors of the present invention, the above-mentioned narrow width and large bead diameter tire has also reduced tread width according to the reduced tire section width. With this, a shoulder portion of the tire is subjected to high ground contact pressure and a long ground contact length during load application, and thereby there was a new problem to be solved that shoulder wear had generates at the time of cornering.

CITATION LIST

Patent Literature

Patent Document 1: Japanese Unexamined Patent Application Publication No. 2004-010781
Patent Document 2: Japanese Unexamined Patent Application Publication No. 2004-002622

SUMMARY OF INVENTION

Technical Problem

The present invention has an object to provide a pneumatic tire with narrow width and large bead diameter capable of suppressing uneven shoulder wear while improving fuel consumption of the tire, in terms of basically setting distribution in an axial direction of a tread thickness from a carcass to the outer surface of the tread portion.

Solution to Problem

The present invention is directed to a pneumatic tire including a carcass extending between bead cores of bead portions through a tread portion and sidewall portions, a tire section width Wt (unit: mm) in relation to a bead diameter Db (unit: inch) satisfying the following equations (1) and (2), $$Wt \leq -0.7257 \times (Db)^2 + 42.763 \times Db - 339.67 \quad (1) \text{ and}$$

$$Wt \geq -0.7257 \times (Db)^2 + 48.568 \times Db - 552.33 \quad (2); \text{ and}$$

in a tread thickness distribution curve f(y) represented by equation (3) below, $$f(y) = 1 - t(y)/t(0) \quad (3),$$

when y=0.4, the value of f(y) is in a range of from 0.03 to 0.06, and a rate of change of the value of f(y) increases to y=0.4 and decreases thereafter, where t(y) denotes a tread thickness which is a distance in a radial direction of the tire from an outer surface of the carcass to an outer surface of the tread portion at each tire axial position Py, and y represents a ratio of an axial distance from a tire equatorial plane to an axial distance L from the tire equatorial plane to a maximum-width position of the carcass.

In the pneumatic tire according to the present invention, a tire outer diameter Dt (mm) preferably satisfies the following equations (4) and (5), $$Dt \leq 59.078 \times Wt^{0.498} \quad (4) \text{ and}$$

$$Dt \geq 59.078 \times Wt^{0.467} \quad (5).$$

In the pneumatic tire according to the present invention, when y=0.3, the value of f(y) is preferably in a range of from 0.01 to 0.03, and when y=0.5, the value of f(y) is preferably in a range of from 0.06 to 0.105.

In this specification, dimensions of each portion of the tire is identified while holding the bead portions so as to fit the rim width defined by the tire size without assembling with the rim, unless otherwise noted.

Advantageous Effects of Invention

The pneumatic tire according to the present invention is configured as a tire having narrow width and large bead diameter satisfying the above mentioned equations (1) and (2). Therefore reduction of energy loss in the tread portion and the sidewall portion, reduction of tire weight, and reduction of air resistance may be achieved, thereby improving fuel consumption.

However, since the tire having narrow width and large bead diameter has a narrow tread width, the problem of shoulder wear may occur at cornering.

In the present invention, the shoulder uneven wear of the tire having narrow width and large bead diameter may be prevented while further enhancing the effect of improving the foregoing fuel economy, by specifying the tread thickness distribution curve f(y) defined by the above equation (3) into a certain range.

Here, at the tire axial position P0.4 of the tread portion where y=0.4, the ground contact length generally becomes longer and the ground contact pressure generally becomes higher. This cause is such that when a load is applied to the tire, the tread portion bends at the vicinity of a ground contact edge and then the tread rubber is subjected to be compressed in the axial and circumferential directions so as to gather around the tire axial position P0.4. When the ground contact length becomes longer and the ground contact pressure becomes higher, the tire will bring disadvantage of uneven wear resistance on the shoulder portion, during cornering.

In particular, when the tread thickness t(y) is uniformly distributed in the axial direction of the tire, that is, when the tread thickness distribution curve f(y) is approximately equal to zero, the above mentioned tendency remarkably appears. On the other hand, when f(y) is defined as a curve which increases with y, this tendency is improved.

However, when the value of f(y) is less than 0.03 when y=0.4, the tread thickness t (0.4) at the tire axial position of P0.4 is still thick enough with respect to the tread thickness t(0) at the tire equatorial plane, and the tread rubber may also deform thicker by being compressed from outside in the axial direction of the tire. As a result, the ground contact pressure is still high, and thereby uneven wear resistance on the shoulder portions during cornering is not sufficiently improved. In addition, when the value of f(y) is greater than 0.06 when y=0.4, the ground contact length on the side of tire equatorial plane is long, and the ground contact length on the side of shoulder portion is short. As a result, the shoulder portion tends to slip largely against the road during free rolling, and therefore uneven wear on the shoulder portion tends to promote during straight traveling.

Moreover, even if the value of f(y) is in a range of from 0.03 to 0.06 when y=0.4, it is necessary that the rate of change of f (y) increases to y=0.4 and decreases thereafter. When the above mentioned change rate is not satisfied this, e.g. the change rate is linear, the tread thickness t (y) is not only too thin on the side of tire equator but also too thick on the side of shoulder portion. Thus, uneven wear on the shoulder portion during cornering cannot be sufficiently improved in the same way as the condition of f(0.4)<0.03.

DESCRIPTION OF EMBODIMENTS

Hereinafter, an embodiment of the present invention will be described in detail.

Figure 1:
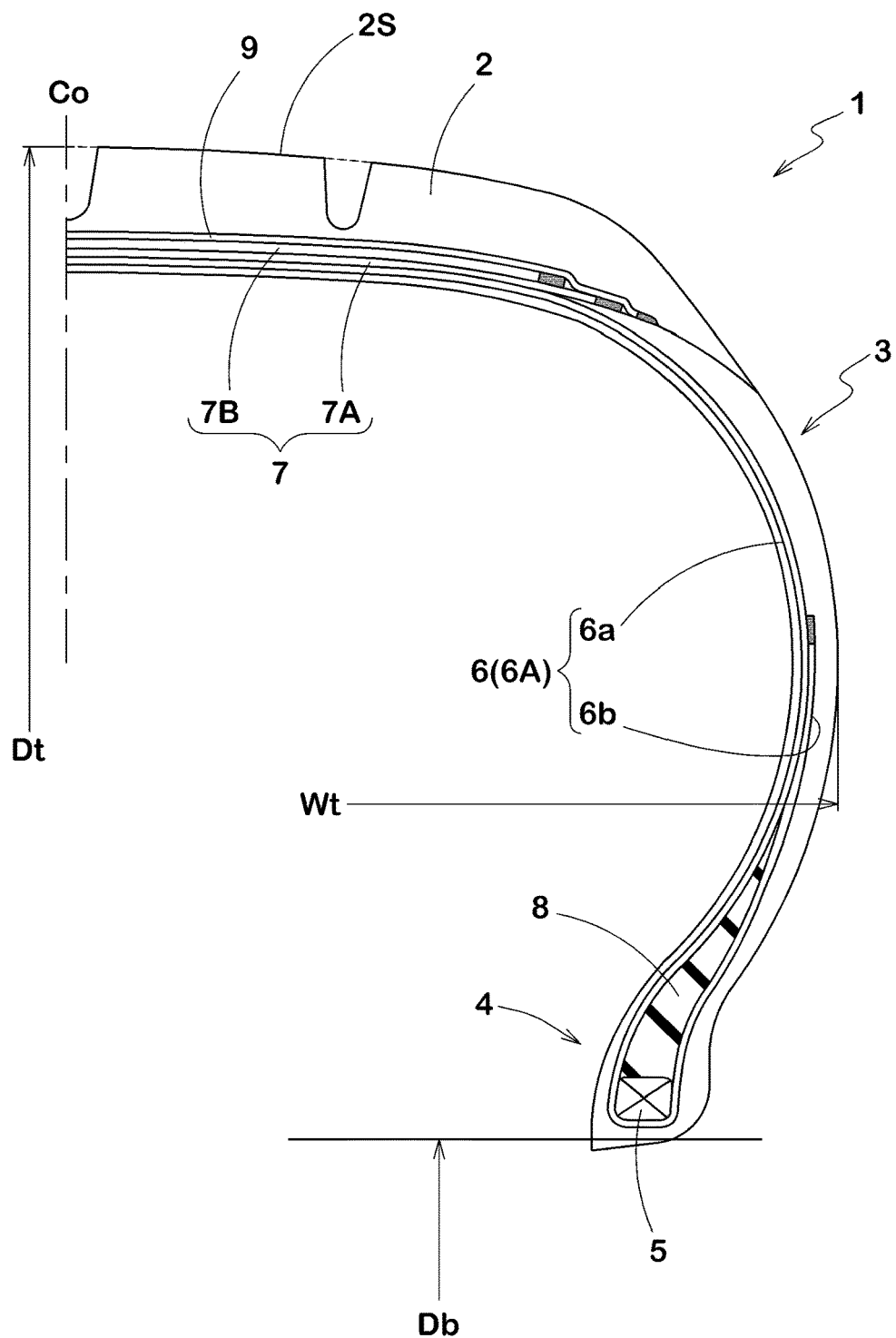
FIG. 1 is a cross sectional view of a pneumatic tire according to the present embodiment of the invention.

As illustrated in FIG. 1, a pneumatic tire 1 according to the present embodiment includes a carcass 6 extending between bead cores 5 of bead portions 4 through a tread portion 2 and sidewall portions 3. In this embodiment, the pneumatic tire 1 is illustrated as a radial tire for passenger cars, for example.

The carcass 6 includes at least one carcass ply 6A of carcass cords arranged at an angle of from 75 to 90 degrees with respect to a tire equatorial plane Co, for example. In this embodiment, one carcass ply 6A is employed. The carcass ply 6A includes a toroidal ply main body portion 6a extending between the bead cores 5 and 5, and a pair of ply turn-up portions 6b each turned up around the bead core 5 from axially inside to the outside of the tire. A bead apex rubber 8 that extends radially outwardly from the bead core 5 in a tapered shape is disposed between the ply main body portion 6a and the ply turn-up portion 6b to reinforce the bead portion.

A belt layer 7 is disposed radially outward of the carcass 6 in the tread portion 2. The belt layer 7 includes at least two, two in this embodiment, belt plies 7A and 7B of belt cords arranged at an angle of from 10 to 35 degrees with respect to the tire equatorial plane Co. The belt cords of each ply intersect one another. This increases the belt rigidity, and the tread portion 2 can be reinforced strongly with a hoop effect.

In this embodiment, a band layer 9 is disposed radially outward of the belt layer 7 which is formed by spirally winding a band cord at an angle of not more than 5 degrees with respect to the tire equatorial plane Co in order to improve high speed durability. As the band layer 9, a pair of right and left edge band plies each covering only an axially outer end of the belt layer 7, or a full band ply which covers substantially the entire width of the belt layer 7 may be used as appropriate. In this embodiment, the band layer 9 is composed of one full band ply, for example.

The pneumatic tire 1 is configures as a narrow width and large bead diameter tire in which a tire section width Wt (Unit: mm) and a bead diameter Db (Unit: inch) satisfy the following equations (1) and (2).

$$Wt \leq -0.7257 \times (Db)^2 + 42.763 \times Db - 339.67 \quad (1)$$

$$Wt \geq -0.7257 \times (Db)^2 + 48.568 \times Db - 552.33 \quad (2)$$

Figure 2:
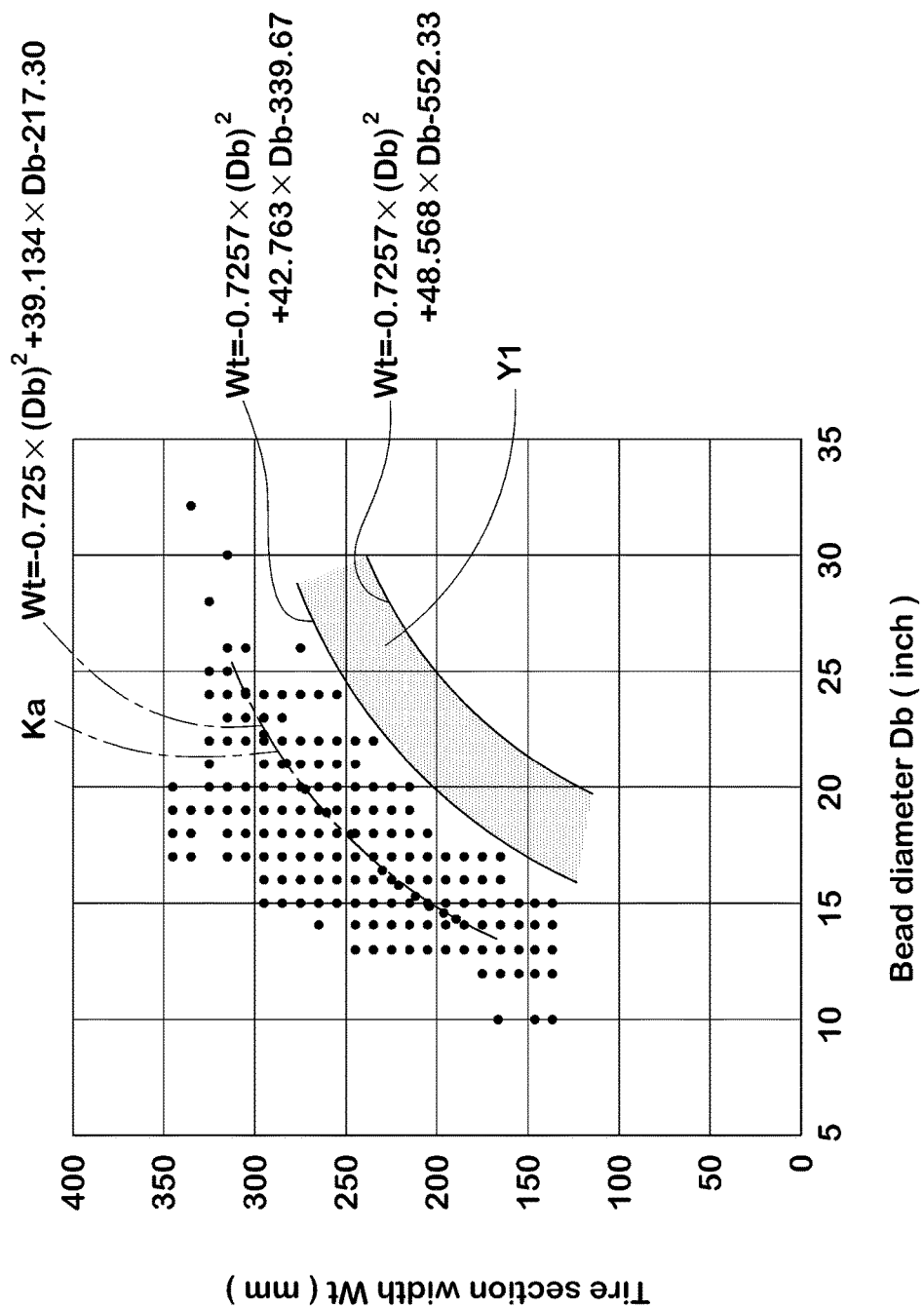
FIG. 2 is a graph showing the relationship between a tire section width and a bead diameter of conventional tires based on JATMA.

FIG. 2 is a graph showing the relationship between the tire section width Wt and the bead diameter Db of conventional tires based on JATMA. From this study result, the average relationship between the tire section width and the bead diameter of the conventional tires based on JATM, as indicated by one-dot chain line Ka in the Figure, it can be identified by the following equation (A):

$$Wt = -0.7257 \times (Db)^2 + 39.134 \times Db - 217.30 \quad (A).$$

In contrast, the region Y1 that satisfies the equations (1) and (2) is outside the scope of the conventional tires shown in the plots. Furthermore, the region Y exists on the location where the relationship Ka identified by the equation (A) is moved parallel to a direction to decrease the tire section width Wt as well as to enlarge the bead diameter Db. That is, the tire satisfying the equations (1) and (2) is configured so as to have a narrow tire section width Wt and an enlarged bead diameter Db as compared with conventional tires having the same tire outer diameter.

Such a tire with a narrow tire section width may provide a narrow tread width which offers less tread rubber volume accordingly. Therefore energy loss amount by the tread rubber is relatively less, and the tire mass is also reduced. Furthermore, when a vehicle is viewed from its front, a tire exposed area appearing downwardly from a bumper edge is reduced according to the reduced tire section width. This makes it possible to reduce the air resistance of the tire.

Furthermore, since the tire has an enlarged bead diameter as compared with conventional tires having the same tire outer diameter, a sidewall region which tends to deform largely during traveling becomes narrow. As a result, a reduction in energy loss by the sidewall portion 3 as well as the weight of the tire can be achieved.

Accordingly, the tire having narrow width and large bead diameter may improve the fuel efficiency through a reduction in energy loss by the tread portion 2 and the sidewall portions 3, a reduction in tire mass, and the reduction of air resistance.

When the tire section width Wt does not satisfy the equation (1), improvement of the fuel efficiency is insufficient owing to insufficient improvement reducing the section width or enlarging the bead diameter. When the tire does not satisfy the equation (2), the tire tends to have excessively narrow width. Such a tire may be necessary to be inflated with a high internal pressure in order to ensure use of under the load capacity. In this situation, ride comfort and road noise performance may be deteriorated.

In order to further improve the fuel efficiency, the pneumatic tire 1 has a tire outer diameter Dt (Unit: mm) satisfying the following equations (4) and (5).

$$Dt \leq 59.078 \times Wt^{0.498} \quad (4)$$

$$Dt \geq 59.078 \times Wt^{0.467} \quad (5)$$

Figure 3:
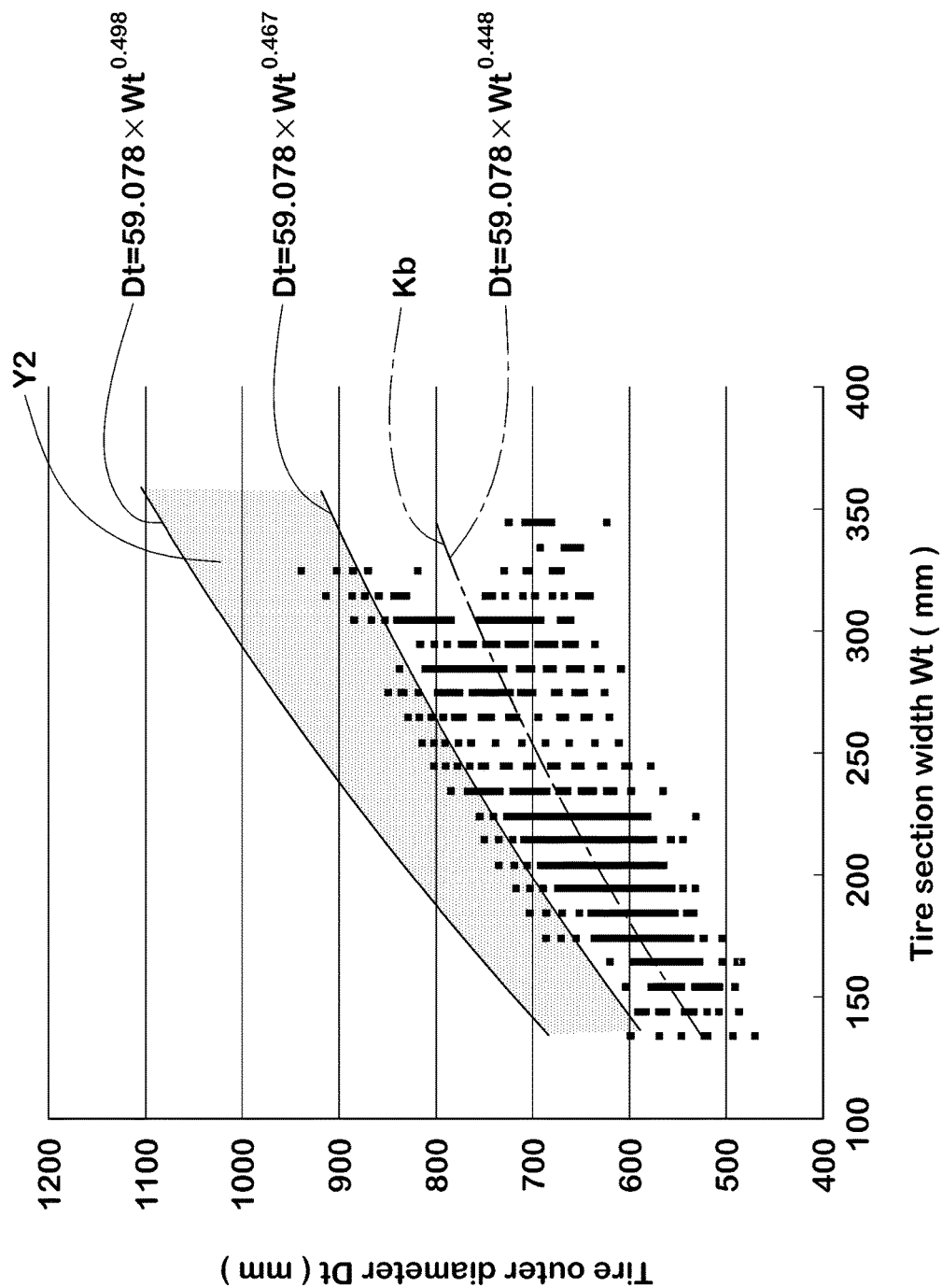
FIG. 3 is a graph showing the relationship between a tire section width and a tire outer diameter of conventional tires based on JATMA.

FIG. 3 illustrates a graph showing the relationship between tire section widths Wt and tire outer diameters Dt of conventional tires based on JATMA. From the study result, the average relationship between tire section widths Wt and tire outer diameters Dt of the conventional tire based on JATMA, as indicated by one-dot chain line Kb in the Figure, can be identified by the following equation (B).

$$Dt = 59.078 \times Wt^{0.448} \quad (B)$$

In contrast, the region Y2 that satisfies the equations (4) and (5) exists on the location where the relationship Kb identified by the equation (B) is moved parallel to a direction to enlarge the tire outer diameter Dt. That is, the tire satisfying the equations (4) and (5) has a narrow width, a large bead diameter and a large tire outer diameter Dt.

Figure 4:
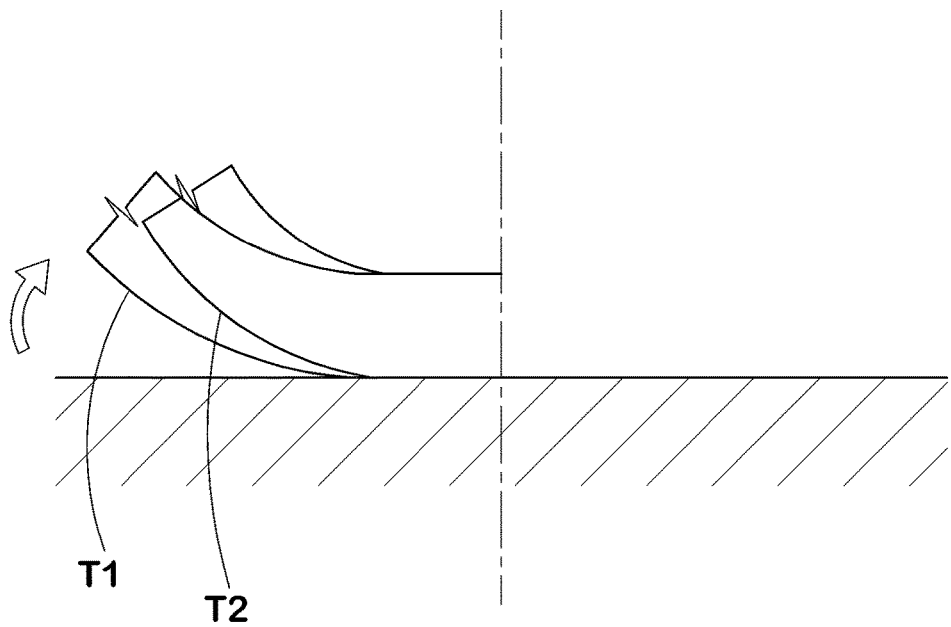
FIG. 4 is a conceptual diagram for explaining the effect of enlarged tire diameter.

The tire T1 with a relatively large outer diameter Dt, as conceptually shown in FIG. 4, is small in amount of bending deformation in the circumferential direction of the tire as compared with the tire T2 with a relatively small outer diameter. Accordingly, the tire is small in energy loss and has advantageous effect of low rolling resistance. Therefore, when the tire does not satisfy the equation (5), low rolling resistance may not be expected. On the other hand, when the tire does not satisfy the equation (4), it may be necessary to be inflated with a high internal pressure to ensure necessary load capacity, and therefore ride comfort and road noise performance may be deteriorated.

The tire with a narrow width and a large diameter tends to have a narrow tread width according to its narrow tire section width. Thus, the tire has a problem that the circumferential ground contact length becomes long when a tire load is applied, the ground contact pressure becomes higher, and shoulder wear during cornering generates. In view of the above, the pneumatic tire 1 according to the present embodiment includes a tread thickness t(y) from the carcass 6 to the outer surface 2S of the tread portion 2, wherein the distribution of the tread thickness t(y) in the axial direction of the tire is defined in a certain range.

Specifically, the tread thickness distribution curve f(y) is defined by the following equation (3), and wherein when y=0.4, the value of f(y) is in a range of from 0.03 to 0.06, and a rate of change of the value of f(y) increases to y=0.4 and decreases thereafter:

$$f(y)=1-t(y)/t(0) \quad (3).$$

Figure 5:
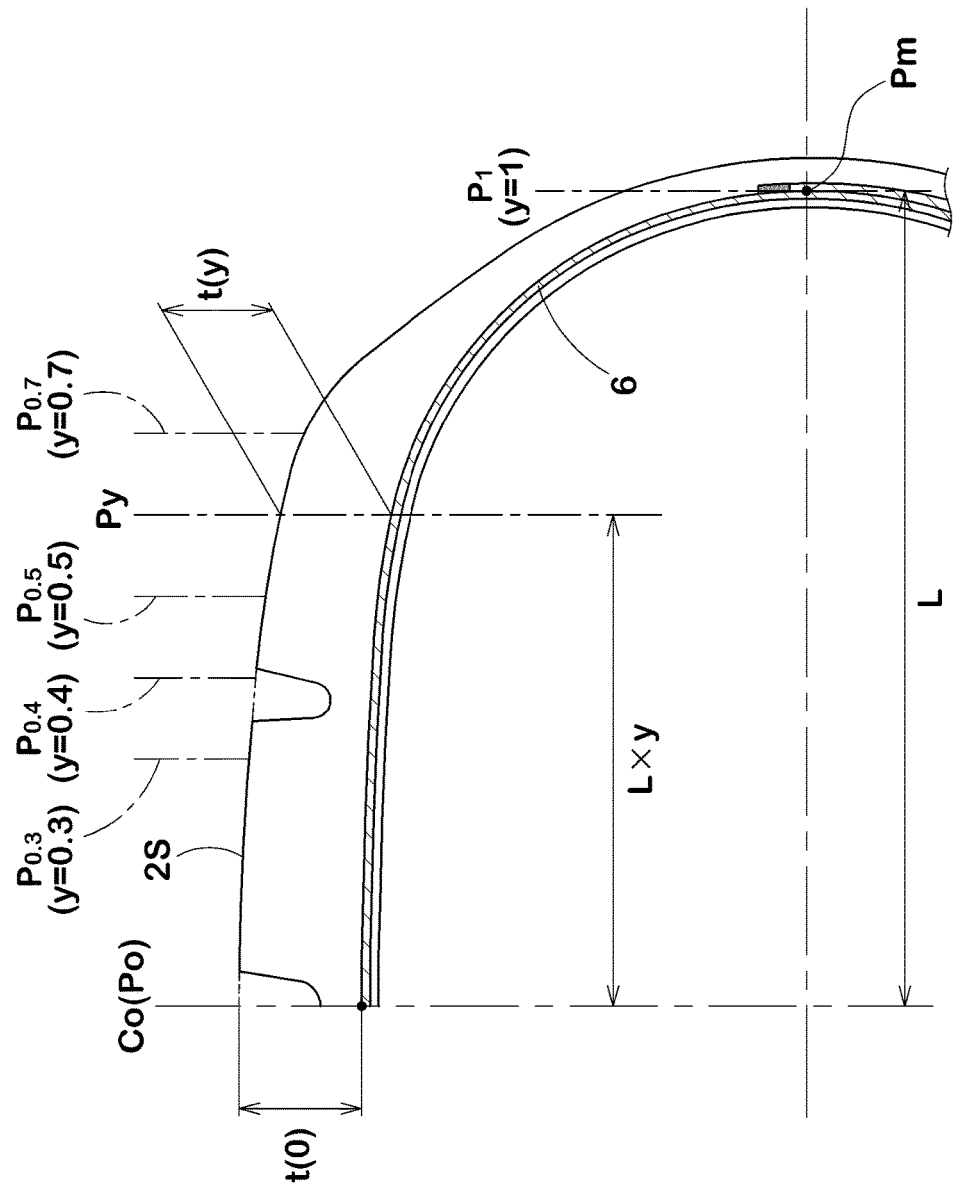
FIG. 5 is a cross sectional view for explaining a tread thickness t(y).

As illustrated in FIG. 5, t(y) denotes a tread thickness which is a distance in the radial direction of the tire from an outer surface of the carcass 6 to the outer surface 2S of the tread portion 2 at each position Py. Furthermore, y represents a ratio of an axial distance from the tire equatorial plane Co to the axial distance L from the tire equatorial plane Co to the maximum width position Pm of the carcass 6. That is, for example, the tire axial position P0.4 means the tire axial position which is apart from the tire equatorial plane Co in the axial distance of 0.4 times the distance L. On the other hand, an axial distance of the tire axial position Py is obtained by the product of L and y (L×y). Note that the maximum width position Pm of the carcass 6 means the axially outermost protruding position of the ply main body portion 6a of the carcass 6.

The tread thickness distribution curve f(y) shows a rate of change of the tread thickness t(y) in each tire axial position Py with respect to the tread thickness t(0) at the position of the tire equatorial plane Co (it corresponds to the tire axial position P0). Then, a uniform ground contact pressure and an optimum shape of ground contact patch of the tire are achieved by defining the value of the tread thickness distribution curve f(y) at y=0.4 as well as the rate of change of f(y). Accordingly, shoulder uneven wear is improved.

Figure 6:
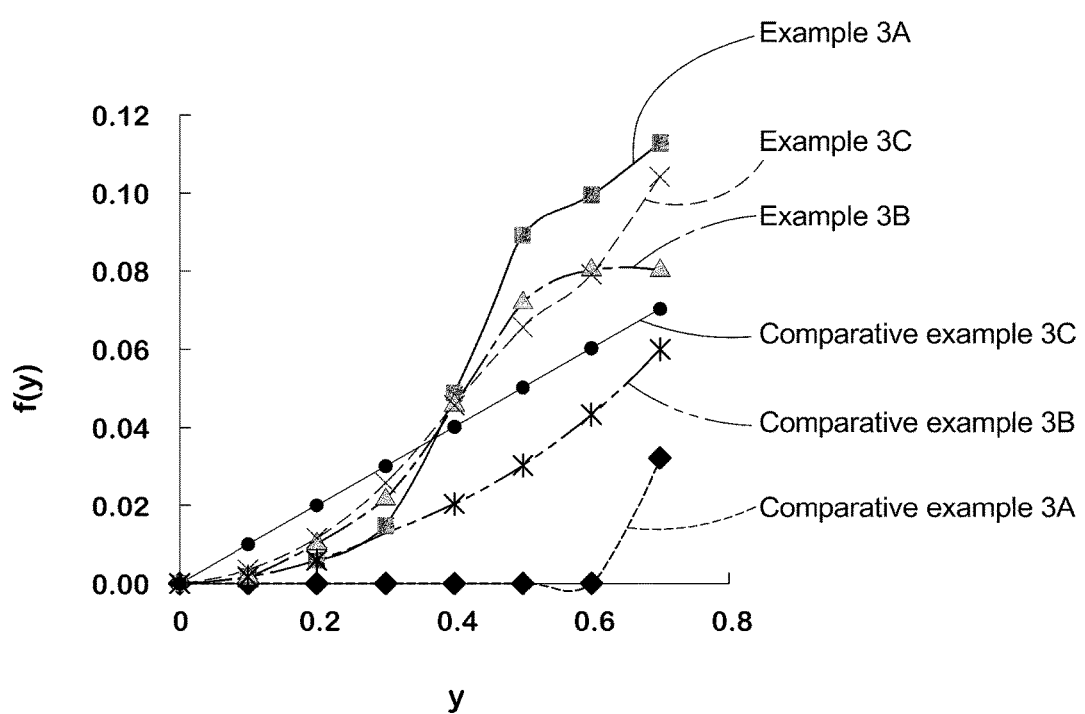
FIG. 6 is a graph illustrating the tread thickness distribution curve f (y) of Examples 3A to 3C, and Comparative Examples 3A to 3C described in Table 2.

FIG. 6 is a graph illustrating the tread thickness distribution curve f (y) of Examples 3A to 3C, and Comparative Examples 3A to 3C in Table 2 described later. FIGS. 7A to 7D are plan views each illustrating ground contact patch of Examples 3A, 3B, Comparative Example 3A and 3B. In the ground contact patches, the darker colored portion corresponds to a region where high ground pressure is acted.

Figure 7A:
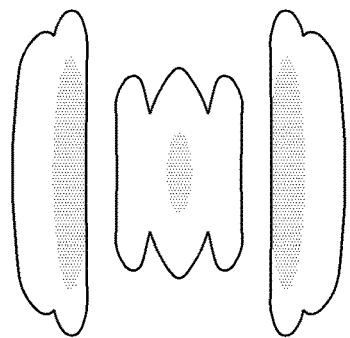
FIGS. 7A to 7D are plan views each illustrating ground contact patch of Examples 3A, 3B, Comparative Example 3A and 3B.

Here, at the tire axial position P0.4 in which y=0.4, the ground contact length normally becomes longer, and the ground contact pressure normally becomes higher. This cause is such that when a load is applied to the tire, the tread portion bends at the vicinity of the ground contact edge and then the tread rubber is subjected to be compressed in the axial and circumferential directions so as to gather around the tire axial position P0.4. When the ground contact length becomes longer and the ground contact pressure becomes higher, the tire will bring disadvantage of uneven wear resistance on the shoulder portion, during cornering. In particular, as shown in the Comparative Example 3A, when the tread thickness t(y) is uniformly distributed in the axial direction of the tire so that the tread thickness distribution curve f(y) substantially corresponds to a horizontal linear, i.e., f(y) substantially equals to zero, the ground contact length becomes excessively long and the ground contact pressure becomes higher at the shoulder portion, as shown in FIG. 7A.

This tendency is improved by using the curve f(y) which increases with y.

Figure 7B:
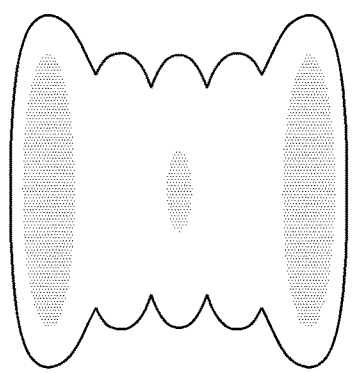
Figure 7C:
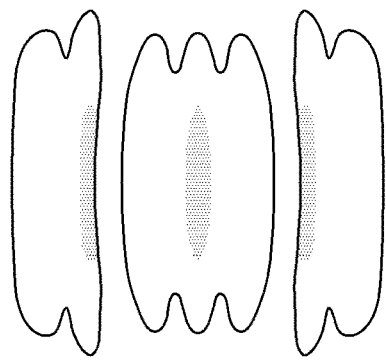
Figure 7D:
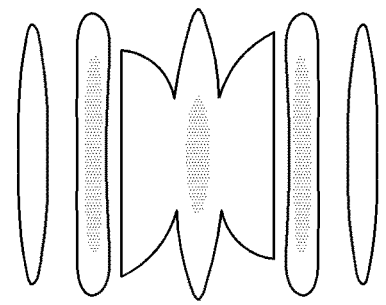

However, as shown in Comparative Example 3B, when the value of f(y) is less than 0.03 when y=0.4, the tread thickness t(0.4) at the tire axial position of P0.4 is still thick enough with respect to the tread thickness t(0) at the tire equatorial plane, and the tread rubber may also deform thicker by being compressed from outside in the axial direction of the tire. As a result, the ground contact pressure is still high, and thereby uneven wear resistance on the shoulder portions during cornering is not sufficiently improved, as shown in FIG. 7B.

On the other hand, when the value of f(y) is greater than 0.06 when y=0.4, the ground contact length on the side of tire equatorial plane is long, and the ground contact length on the side of shoulder portion is short. As a result, the shoulder portion tends to slip largely against the road during free rolling, and therefore uneven wear on the shoulder portion tends to occur even during straight traveling.

Moreover, even if the value of f(y) is in a range of from 0.03 to 0.06 when y=0.4, it is necessary that the rate of change of f (y) increases to y=0.4 and decreases thereafter. When the above mentioned change rate is not satisfied the above mentioned ranges, e.g. the change rate is linear (e.g. Comparative Example 3C), the tread thickness t (y) is not only too thin on the side of tire equator but also too thick on the side of shoulder portion. Thus, uneven wear on the shoulder portion during cornering cannot be sufficiently improved in the same way as the Comparative Example 3B. Here, the rate of change of f (y) means a tangent slope of the curve f (y) which corresponds to the value (d (f(y))/dy) obtained by differentiating f(y) with respect to y.

Preferably, the value of the tread thickness distribution curve f (y), in the case of y=0.3, is in a range of from 0.01 to 0.03, and in the case of y=0.5, the value of f (y) is preferably in a range of from 0.06 to 0.105. When the value of f(y) in the case of y=0.3 is less than 0.01, the tread thickness on the side of the tire equatorial plane Co may be too thick. On the other hand, when the value is greater than 0.03, the tread thickness may be too thin. In both cases, the ground contact pressure tends to be distributed unevenly. Furthermore, the value of f(y) in the case of y=0.5 is less than 0.06, the tread thickness t(y) on the shoulder side may be too thick. On the other hand, when the value is greater than 0.105, the tread thickness may be too thin. In both cases, the ground contact pressure tends to be distributed unevenly. As a result, it may be difficult to improve uneven wear on the shoulder portion.

While the particularly preferable embodiments in accordance with the present invention have been described in detail, the present invention is not limited to the illustrated embodiments, but can be modified and carried out in various aspects.

EXAMPLE (1) Pneumatic tires having an internal structure shown in FIG. 1 were manufactured based on the specification in Table 1. Then, rolling resistance, air resistance and ride comfort of each test tire was tested. In each tire, the tread thickness distribution is the same as follows: f(0.1)=0.00, f(0.2)=0.01, f(0.3)=0.02, f(0.4)=0.05, f(0.5)=0.07, f(0.06)=0.08 and f(0.7)=0.08. Furthermore, the rate of change of f(y) is set to be increased to y=0.4 and decreased thereafter. Only the tire section width Wt, the bead diameter Db and the tire outer diameter Dt are different.

Rolling Resistance:

Using a rolling resistance tester, under the following conditions, rolling resistance (unit: N) of each test tire was measured. The test results were shown using an index of the reciprocal of the respective rolling resistance, wherein Comparative Example 1 is 100. The larger the value, the lower the rolling resistance is.

Temperature: 20 degrees C.
Load: 4.82 kN
Internal pressure: Listed in Table 1
Rim: Standard rim
Speed: 80 km/h Air resistance:

In a laboratory, a force received from each test tire mounted on a vehicle was measured under the condition where the air with a speed corresponding to the vehicle running speed of 100 km/h was provided toward the test tire exposed from a lower edge of the bumper, wherein the tire exposed height was set to 140 mm. The test results were shown using an index of the reciprocal of the respective forces, wherein Comparative Example 1 is 100. The larger the value, the better the air resistance is.

Ride comfort:

Vertical spring constant of each test tire was measured, and then was indicated using an index of the reciprocal of the respective constants, wherein Comparative Example 1 is 100. The larger the value, the better the ride comfort.

TABLE 1

|  | Com. Ex. 1 | Com. Ex. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Tire section width Wt (mm) | 195 | 165 | 165 | 165 | 165 | 165 | 165 | 155 | 185 | 185 |
| Bead diameter Db (inch) | 15 | 16 | 18 | 19 | 20 | 22 | 21 | 18 | 21 | 19 |
| Internal pressure (kPa) | 250 | 350 | 320 | 310 | 300 | 280 | 290 | 360 | 220 | 240 |
| Rim width (inch) | 6 | 5 | 5 | 5 | 5 | 5 | 5 | 4.5 | 5.5 | 5.5 |
| Tire outer diameter Dt (mm) | 630.0 | 616.1 | 666.3 | 691.4 | 716.5 | 766.7 | 741.6 | 653.3 | 767.6 | 717.4 |
| Rolling resistance | 100 | 102 | 103 | 104 | 104 | 104 | 104 | 103 | 101 | 102 |
| Ride comfort | 100 | 92 | 93 | 90 | 94 | 80 | 90 | 90 | 90 | 90 |
| Air resistance | 100 | 114 | 114 | 114 | 114 | 116 | 115 | 120 | 102 | 105 |

|  | Com. Ex. 3 | Ex. 9 | Ex. 10 | Ex. 11 | Ex. 12 |
|---|---|---|---|---|---|
| Tire section width Wt (mm) | 155 | 135 | 195 | 155 | 215 |
| Bead diameter Db (inch) | 22 | 19 | 19 | 19 | 19 |
| Internal pressure (kPa) | 310 | 380 | 260 | 320 | 230 |

TABLE 1-continued

| | | | | | |
|---|---|---|---|---|---|
| Rim width (inch) | 4.5 | 3.5 | 6 | 4.5 | 7 |
| Tire outer diameter Dt (mm) | 753.7 | 692.9 | 691.4 | 693.9 | 691.9 |
| Rolling resistance | 106 | 102 | 102 | 103 | 95 |
| Ride comfort | 75 | 85 | 95 | 88 | 104 |
| Air resistance | 120 | 125 | 100 | 120 | 90 |

(2)

Pneumatic tires which differed from the control tire of Example 3 (Example 3A) with respect to only the tread thickness distribution curve as the specification of Table 2 were manufactured. Then, rolling resistance and uneven wear on the shoulder portion (Sh wear resistance) was tested.

Sh wear resistance:

Using a wear energy test apparatus, under the following conditions, the wear energy Ec of a block (central block) in the block row (central block row) closet to the tire equatorial plane, and the wear energy Es of a block (shoulder block) in the block row (shoulder block row) closet to the ground contact edge were measured. The results of Sh wear resistance were evaluated using the value in which the reciprocal of the wear energy ratio Es/Ec is multiplied by 100. For example, when the ratio Es/Ec=1.33, Sh wear resistance is (1/1.33)×100=75.

Internal pressure: Listed in Table 1
Rim: Standard rim
Load: 4.82 kN
Camber angle: 0.0 degree

The invention claimed is:

1. A pneumatic tire comprising:
   a carcass extending between bead cores of bead portions through a tread portion and sidewall portions;
   a tire section width Wt (unit: mm) in relation to a bead diameter Db (unit: inch) satisfying the following equations (1) and (2), $$Wt \leq -0.7257 \times (Db)^2 + 42.763 \times Db - 339.67 \quad (1),$$

$$Wt \geq -0.7257 \times (Db)^2 + 48.568 \times Db - 552.33 \quad (2); \text{ and}$$

in a tread thickness distribution curve f(y) represented by equation (3) below, $$f(y) = 1 - t(y)/t(0) \quad (3),$$

when y=0.4, the value of f(y) is in a range of from 0.03 to 0.06, and a rate of change of the value of f(y) increases to y=0.4 and decreases thereafter,
   where t(y) denotes a tread thickness which is a distance in a radial direction of the tire from an outer surface of the carcass to an outer surface of the tread portion at each tire axial position Py, wherein the tread thickness is the thickness along a ground contact region of the tread portion which is 0.7 times a maximum-width L of the carcass from the tire equatorial plane to a maximum-width position of the carcass, and y represents a ratio of an axial distance from the tire equatorial plane, to the maximum-width L of the carcass.

2. The pneumatic tire according to claim 1, wherein when y=0.3, the value of f(y) is in a range of from 0.01 to 0.03, and when y=0.5, the value of f(y) is in a range of from 0.06 to 0.105.

3. The pneumatic tire according to claim 1, wherein a tire outer diameter Dt (mm) satisfies the following equations (4) and (5):

$$Dt \leq 59.078 \times Wt^{0.498} \quad (4); \text{ and}$$

$$Dt \geq 59.078 \times Wt^{0.467} \quad (5).$$

TABLE 2

| | Com. Ex. 3A | Ex. 3A | Ex. 3B | Ex. 3C | Com. Ex. 3B | Com. Ex. 3C | Ex. 3D | Ex. 3E | Ex. 3F | Ex. 3G | Ex. 3H | Ex. 3I |
|---|---|---|---|---|---|---|---|---|---|---|---|---|
| Tread thickness t(0) | 12.6 mm | | | | | | | | | | | |
| Tread thickness distribution curve f(y) | | | | | | | | | | | | |
| f(0.1) | 0.00 | 0.00 | 0.00 | 0.00 | 0.00 | 0.01 | 0.00 | 0.00 | 0.00 | 0.00 | 0.00 | 0.00 |
| f(0.2) | 0.00 | 0.01 | 0.01 | 0.01 | 0.01 | 0.02 | 0.01 | 0.01 | 0.01 | 0.01 | 0.01 | 0.01 |
| f(0.3) | 0.00 | 0.01 | 0.02 | 0.03 | 0.01 | 0.03 | 0.02 | 0.02 | 0.01 | 0.03 | 0.02 | 0.02 |
| f(0.4) | 0.00 | 0.05 | 0.05 | 0.05 | 0.02 | 0.04 | 0.03 | 0.06 | 0.05 | 0.05 | 0.05 | 0.05 |
| f(0.5) | 0.00 | 0.09 | 0.07 | 0.07 | 0.03 | 0.05 | 0.07 | 0.07 | 0.07 | 0.07 | 0.06 | 0.105 |
| f(0.6) | 0.00 | 0.10 | 0.08 | 0.08 | 0.04 | 0.06 | 0.08 | 0.08 | 0.08 | 0.08 | 0.08 | 0.105 |
| f(0.7) | 0.03 | 0.11 | 0.08 | 0.10 | 0.06 | 0.07 | 0.08 | 0.08 | 0.08 | 0.08 | 0.08 | 0.105 |
| Sh wear resistance | 75 | 85 | 95 | 88 | 78 | 76 | 81 | 81 | 81 | 85 | 85 | 81 |
| Rolling resistance | 108 | 114 | 121 | 117 | 113 | 111 | 121 | 118 | 118 | 118 | 118 | 118 |

As shown in Table, it is confirmed that the tires of Examples improve the fuel consumption while ensuring the wear resistance of the shoulder portion (rolling resistance and air resistance).

REFERENCE SIGNS LIST

1 Pneumatic tire
2 Tread portion
3 Sidewall portion
4 Bead portion
5 Bead core
6 Carcass
Co Tire equatorial plane
Pm Maximum width position 4. The pneumatic tire according to claim 3, wherein when y=0.3, the value of f(y) is in a range of from 0.01 to 0.03, and when y=0.5, the value of f(y) is in a range of from 0.06 to 0.105.

* * * * *